United States Patent Office 2,750,410
Patented June 12, 1956

2,750,410

CATALYST AND PROCESS FOR MAKING VINYL ESTERS

Eugene W. Hanszen and Lawrence B. Trenholme, La Marque, Tex., assignors to Union Carbide and Carbon Corporation, a corporation of New York No Drawing. Application November 22, 1952,
Serial No. 322,169

4 Claims. (Cl. 260—498)

This invention relates to an improved catalyst and process for making vinyl esters by the vapor phase reaction of acetylene and acids.

For such reactions, activated carbon is commonly employed as a carrier for the metals and metal salts employed as a catalyst. Thus, in the vapor phase reaction of acetylene with acetic acid, zinc or cadmium salts, particularly the acetates, supported on activated carbon are employed as catalysts. At temperatures of 130° to 350° C., commonly used in acetylene addition reactions to form vinyl esters, acetylene tends to polymerize to form solid polymers, particularly if the acetylene used is contaminated with other acetylene compounds, such as mono- or divinyl actylene, methyl or ethyl acetylenes and the like. This tendency to polymer formation is especially acute when activated carbon is employed as the catalyst carrier, since commercial forms of activated carbon contain minute amounts of iron and copper impurities, which act as catalysts for the formation of solid polymers of acetylene.

The formation of these polymers reduces the life of the catalyst. This reduction is caused by the polymers surrounding the active centers of the catalyst and preventing access of the reactants to the catalyst. The polymers formed also fill the spaces between the pellets of activated carbon, and the blocking of these spaces not only increases the pressure drop across the catalyst bed, but also isolates certain sections of the bed from the stream of gaseous reactants. In addition, the formation of these solid polymers between the individual catalyst pellets makes it difficult to remove spent catalyst from the catalyst reactor.

According to this invention, it has been found that impregnation of activated carbon catalysts for addition reaction of acetylene with a bismuth compound, such as bismuth iodide or bismuth oxyiodide, greatly reduces or eliminates the formation of solid polymers of acetylene. By the elimination of these solid polymers from the catalyst, the life of the catalyst is greatly increased and a low and uniform pressure drop across the catalyst bed may be maintained. Also, since the catalyst body is free of deposits of polymer, the removal of spent catalyst from the catalyst reactor is greatly facilitated. In place of the bismuth iodide or bismuth oxyiodide, other bismuth compounds may be substituted, such as bismuth chloride, bromide or fluoride and the corresponding oxyhalides, bismuth oxide or hydroxide, bismuth oxynitrate and the like. The impregnation of the activated carbon carrier with any of these bismuth compounds may be carried out at the same time as the catalyst metals or metal salts are deposited on the carrier or the bismuth compound may be added after the main body of the catalyst has been applied to the carrier. To impregnate the activated carbon carrier with the bismuth compound, it is preferable to apply the bismuth compound dissolved in a suitable solvent, such as acetone. Upon evaporation of the solvent a uniform impregnation of the carrier with the bismuth compound is obtained.

The amount of the bismuth compound required to inhibit the formation of solid acetylene polymers is very small, as little as 10 p. p. m. (parts per million of catalyst carrier) being effective. However, it is preferred to use larger quantities of the bismuth compound for greater protection, and the amount used will vary depending on the copper content of the activated carbon. Thus, with an activated carbon containing 40 p. p. m. of copper (determined by nitric acid digestion), we prefer to add about 500 p. p. m. of bismuth triiodide.

The activated carbon carrier impregnated with a bismuth compound according to this invention is of wide utility for vapor phase addition reactions of acetylene. The actual metals or metal salts supported on the carrier will vary, however, depending on the particular reaction of acetylene involved. Such reactions included the addition of acetylene to volatile inorganic acids, such as hydrogen chloride, hydrogen fluoride, and hydrogen cyanide to form the respective vinyl esters of these acids, and the reactions of acetylene with volatile organic acids, such as acetic acid, propionic acid and butyric acid to form vinyl organic esters. Any of the known catalysts for such reactions may be employed. For example, known catalysts for making acrylonitrile from acetylene and hydrogen cyanide include sodium cyanide, zinc chromite-cadmium chromite mixtures, zinc cyanide and zinc oxide-cadmium oxide mixtures; known vinyl chloride vapor phase synthesis catalysts include mercuric chloride and mixtures of mercuric chloride with barium chloride; and mercuric chloride or fluoride have been used as catalysts for producing vinyl fluoride from acetylene and hydrogen fluoride.

The following examples will illustrate the invention:

*Example 1*

Samples of activated carbon weighing 6.13 grams each were placed in half-inch diameter steel tubes in an electric furnace maintained at 300° C. Seven cubic feet per hour of acetylene were blown through each tube for a total of 140 hours. At the end of this period the samples of carbon were removed, inspected and reweighed. The following results were obtained with carbon A which contained 40 p. p. m. of nitric acid soluble copper and 87 p. p. m. of total copper, and with carbon B which contained a trace of nitric acid soluble copper and 13 p. p. m. of total copper, using both relatively pure acetylene and acetylene contaminated with higher acetylenes:

|  | Acetylene | | AcetylenePlus 0.1 Mol Percent Higher Acetylenes | |
|---|---|---|---|---|
|  | Amount of Acetylenic Polymers Formed | | Amount of Acetylenic Polymers Formed | |
|  | Percent Gain in Wt. | By Visual Exam. | Percent Gain in Wt. | By Visual Exam. |
| Carbon A | 10.8 | Large amount | 22.6 | Very large amount. |
| Carbon B | Nil | Small amount | 6.4 | Medium amount. |

Using the same test conditions, a series or runs were made using carbon A impregnated with varying amounts of an acetone solution of bismuth triiodide. The following results were obtained:

|  | Acetylene + 0.1 Mol Percent Higher Acetylenes |
|---|---|
|  | Amount of Acetylenic Polymers Formed |
| Carbon A+10 p. p. m. BI₃ | Trace. |
| Carbon A+100 p. p. m. BI₃ | None. |
| Carbon A+5,000 p. p. m. BI₃ | None. |

Example 2

Tubes 1.7 inches in diameter and 10 feet long were packed with activated carbon containing 35 per cent zinc acetate dihydrate. Liquid was circulated in the jackets of these tubes to maintain a constant temperature in the catalyst bed. Initial bed temperatures of 180° C. were gradually increased to 210° C. as the catalyst became older. Feed to each tube averaged 25 standard cubic feet per hour of gas with a mol ratio of acetylene to acetic acid of 4.0 to 1.0. The pressure drop across the catalyst tubes when first charged was about 10 inches of water, and each tube was run for several months. The acetylene feed contained 0.05 to 0.1 per cent of higher acetylenes.

The following data were obtained after 1250 pounds of vinyl acetate had been made with catalysts containing no inhibitor and with catalyst containing 500 p. p. m. of bismuth oxyiodide.

|  | No Inhibitor | 500 p. p. m. BiOI Added |
|---|---|---|
| Pressure drop (inches H$_2$O) at 25 c. f. h. | 158 | 15. |
| Appearance of Catalyst | Catalyst pores and openings between catalyst particles badly plugged with yellow-brown polymer. | No sign of polymer. |

What is claimed is:

1. Process for making vinyl acetate which comprises reacting the vapors of acetylene and acetic acid at a temperature of 130° to 350° C. in the presence of a catalyst composed of zinc acetate supported on activated carbon containing a minute amount of copper and impregnated with a small amount of bismuth oxyiodide.

2. Process for making vinyl acetate which comprises reacting the vapors of acetylene and acetic acid at a temperature of 130° to 350° C. in the presence of a catalyst composed of zinc acetate supported on activated carbon containing a minute amount of copper and impregnated with a small amount of bismuth triiodide.

3. Process for making vinyl acetate which comprises reacting the vapors of acetylene and acetic acid at a temperature of 130° to 350° C. in the presence of a catalyst composed of cadmium acetate supported on activated carbon containing a minute amount of copper and impregnated with a small amount of bismuth oxyiodide.

4. Process for making vinyl acetate which comprises reacting the vapors of acetylene and acetic acid at a temperature of 130° to 350° C. in the presence of a catalyst composed of cadmium acetate supported on activated carbon containing a minute amount of copper and impregnated with a small amount of bismuth triiodide.

References Cited in the file of this patent

UNITED STATES PATENTS

| 2,376,964 | Groth | May 29, 1945 |
| 2,552,425 | Halbig | May 8, 1951 |